(12) United States Patent
Hain et al.

(10) Patent No.: US 11,966,943 B2
(45) Date of Patent: *Apr. 23, 2024

(54) SYSTEM AND METHOD FOR REWARD VIDEO VIEWING

(71) Applicant: VERASITY LIMITED, Road Town (VG)

(72) Inventors: Robert James Mark Hain, Gibraltar (GI); Svetlana Astakhova, Gibraltar (GI)

(73) Assignee: Verasity Limited S.R.L., San Jose (CR)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,501

(22) Filed: May 1, 2023

(65) Prior Publication Data
US 2023/0267498 A1 Aug. 24, 2023

Related U.S. Application Data

(63) Continuation of application No. 18/054,988, filed on Nov. 14, 2022, now Pat. No. 11,676,171, which is a
(Continued)

(51) Int. Cl.
*G06Q 30/0207* (2023.01)
*G06F 9/445* (2018.01)
(Continued)

(52) U.S. Cl.
CPC ..... *G06Q 30/0239* (2013.01); *G06F 9/44526* (2013.01); *G06Q 30/0272* (2013.01); *H04N 21/4784* (2013.01)

(58) Field of Classification Search
CPC .......... G06Q 30/0239; G06Q 30/0272; H04N 21/4784; G06F 9/44526
See application file for complete search history.

(56) References Cited

U.S. PATENT DOCUMENTS 8,719,855 B2 * 5/2014 Bedi .................. G06Q 30/0241
725/23
8,819,726 B2 * 8/2014 Wetzer ............. H04N 21/25816
725/35
(Continued)

*Primary Examiner* — Michael I Ezewoko
(74) *Attorney, Agent, or Firm* — McCarter & English, LLP; James M. Smedley; Alex Korona

(57) ABSTRACT

Apparatus and associated methods relate to a rewarded viewing video distribution system configured to reward a user for viewed video content based on presenting video content to a user, assigning the user rewards generated based on the value of the video portion viewed, and automatically presenting the user with marketplace credit to spend the rewards. In some embodiments, the viewed video portion value may be determined as a function of a predetermined reward threshold. In an illustrative example, the predetermined reward threshold may be the video percentage viewed. Various implementations may employ a reward threshold based on advertisements viewed, permitting advertisement spending adapted as a function of verified advertisement views. Some examples may reward views using a video player plug-in. Some embodiments may permit a user to spend viewing rewards on affiliated partner services or products. Various examples may advantageously provide earned rewards spendable via an integrated rewards spending gateway.

19 Claims, 14 Drawing Sheets

Related U.S. Application Data continuation of application No. 16/199,813, filed on Nov. 26, 2018, now Pat. No. 11,526,904.

(51) Int. Cl.
*G06Q 30/0272* (2023.01)
*H04N 21/4784* (2011.01)

(56) References Cited

U.S. PATENT DOCUMENTS

| | | | |
|---|---|---|---|
| 9,099,152 B2* | 8/2015 | Marcus | H04N 21/4182 |
| 2014/0089068 A1* | 3/2014 | Yehezkel | G06Q 50/01 |
| | | | 705/14.19 |
| 2017/0270551 A1* | 9/2017 | Chen | G06Q 50/01 |
| 2020/0005349 A1* | 1/2020 | Brody | G06Q 30/0245 |

* cited by examiner

| Component | Technology | Additional Details |
|---|---|---|
| LUM Admin UI + Backend | Angular | Frontend |
| | PHP (Phalcon) | Backend PHP |
| | Akamai CDN | delivery, storage, transcoding |
| | HTTP/REST | for Frontend-Backend interactions |
| 'Rewarded Viewing' In-Player Plugin + API | WebSocket | Client-Server communication |
| | JavaScript | Programming Language |
| LUM Server | CentOS 7 | OS |
| | LLVM/Clang | Programming language |
| | Golang | Programming language |
| | Google Protocol Buffers | as binary |
| | WebSocket++ | Library |
| | Asio C++ | Library |
| | spdlog | Library |
| | RapidJSON | Library |
| | Memcached | as binary |
| LUM DB | MySQL Cluster | |

FIG. 9

SYSTEM AND METHOD FOR REWARD VIDEO VIEWING

RELATED APPLICATIONS

This application claims the benefit of U.S. Nonprovisional patent application Ser. No. 18/054,988, filed Nov. 14, 2022, which is a continuation of U.S. Nonprovisional patent application Ser. No. 16/199,813 filed Nov. 26, 2018, both of which are hereby incorporated by reference in its entirety.

TECHNICAL FIELD

Various embodiments relate generally to rewards earned viewing video content.

BACKGROUND

Video is an image sequence. A sequence of images may be used to tell a story. Some video may be used to tell stories for business purposes. For example, a product story may be designed to promote product sales. Some video content may include stories promoting various services offered in a marketplace by a business. In an illustrative example, a business may host sales or promotional video content on a web site.

Some promotional video content hosted by a business may be designed to sell specific products or services. Promotional video content intended to promote the sale of a particular product may be targeted to a specific market segment. In some scenarios, a customer may purchase a product or service after viewing hosted promotional video content. In an illustrative example, a promotional video publisher may be able to associate the viewed video content with the product or service sale, to quantify the promotion's value based on the market segment.

Some promotional video content may be designed to build brand awareness, increase engagement, or attract followers. In some examples, a publisher may host promotional video content to inform followers about business or product news, such as, for example, development progress, or new features. In an illustrative example, such informational video content may help increase brand engagement and loyalty by educating dedicated followers, while attracting new followers. In some examples of hosted informational video that may not directly sell a specific product or service, the video content publisher may not be able to associate the viewed video content with a sale, and opportunities to reward followers may be lost.

SUMMARY

Apparatus and associated methods relate to a rewarded viewing video distribution system configured to reward a user for viewed video content based on presenting video content to a user, assigning the user rewards generated based on the value of the video portion viewed, and automatically presenting the user with marketplace credit to spend the rewards. In some embodiments, the viewed video portion value may be determined as a function of a predetermined reward threshold. In an illustrative example, the predetermined reward threshold may be the video percentage viewed. Various implementations may employ a reward threshold based on advertisements viewed, permitting advertisement spending adapted as a function of verified advertisement views. Some examples may reward views using a video player plug-in. Some embodiments may permit a user to spend viewing rewards on affiliated partner services or products. Various examples may advantageously provide earned rewards spendable via an integrated rewards spending gateway.

Various embodiments may achieve one or more advantages. For example, some embodiments may reduce a publisher's effort improving brand recognition. This facilitation may be a result of reducing the user's effort obtaining and evaluating statistics describing hosted video content effectiveness based on viewed video portions associated with an identifiable viewer. In some embodiments, rewards spendable for products and services may be automatically assigned to a viewer based on the value of a video content portion viewed. Such automatic reward assignment in response to viewed video content may improve a viewer's response to promotional campaigns and enhance the publisher's reputation among followers. Some embodiments may provide a viewer with rewards spendable for products or services offered by affiliated partners, through a spendable rewards gateway. Various designs may assign a viewer rewards for viewed video content using one or more solution based on configuring embodiment features provided by an exemplary rewarded viewing sdk. In an illustrative example, an exemplary embodiment rewarded viewing sdk may provide features including presenting video content to a user, assigning the user rewards generated based on the value of the video portion viewed, and automatically presenting the user with marketplace credit to spend the rewards.

In some embodiments, an exemplary rewarded video viewing solution may be implemented in a video player hosted on a content publisher's website. Various rewarded video viewing embodiments may be implemented by an embodiment video player plugin incorporating the embodiment features of an exemplary rewarded video viewing sdk. Various embodiment rewarded video viewing solutions may be embedded into a third-party video player using an exemplary rewarded video viewing sdk. Such an embedded rewarded video viewing solution would advantageously be independent of any third party online video player (OVP) platform. Various implementations may improve the efficiency of advertising campaign funds. Such improved advertising funds efficiency may be a result of preventing reward fraud based on authenticating viewers of promotional video content. For example, an authenticated viewer may be assigned rewards for a variety of video content viewed without publisher concern that the viewer may fraudulently obtain rewards. Such authenticated viewing reward assignment may improve the viewer experience and raise the publisher's favorability among followers. In some embodiments, viewers may be assigned rewards for viewing particular advertisements embedded in video content, permitting a publisher to reward viewers with greater precision, improving the accuracy or usefulness of tracking promotional video content effectiveness. For example, a publisher may assign different rewards to different viewers, for viewing the same video content, based on the viewer's value or relationship to the publisher.

The details of various embodiments are set forth in the accompanying drawings and the description below. Other features and advantages will be apparent from the description and drawings, and from the claims.

BRIEF DESCRIPTION OF THE DRAWINGS

FIG. 9 depicts an illustrative tabular view of an exemplary rewarded viewing technology stack.

Like reference symbols in the various drawings indicate like elements.

DETAILED DESCRIPTION OF ILLUSTRATIVE EMBODIMENTS

To aid understanding, this document is organized as follows. First, an exemplary operational scenario in which a viewer earns rewards for viewing a publisher's video content is briefly introduced with reference to FIG. 1. Second, with reference to FIGS. 2-6, the discussion turns to exemplary embodiments that illustrate rewarded video viewing system design. Specifically, illustrative rewarded viewing network, rewarded viewer device, rewarded viewing system, and rewarded viewing module architectural designs are disclosed. Third, with reference to FIGS. 7-8, exemplary process flows illustrative of rewarded viewing operation are described. Then, with reference to FIG. 9, an exemplary rewarded viewing technology stack is disclosed. Finally, with reference to FIGS. 10A-10I, further explanatory discussion and experimental data are presented to explain rewarded viewing user interface design.

Figure 1:
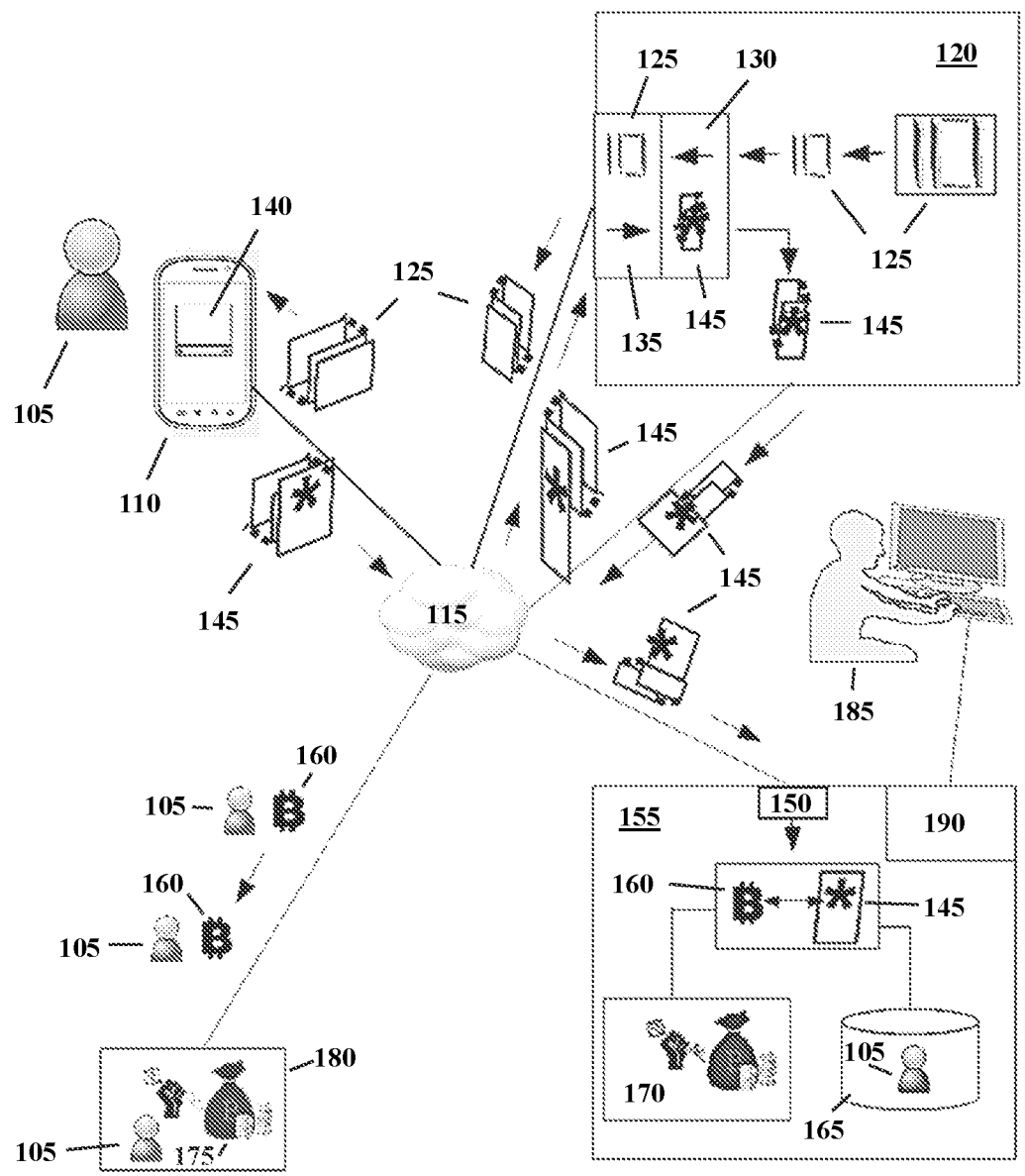
FIG. 1 depicts an exemplary operational scenario wherein a viewer uses an exemplary rewarded viewing video distribution system configured to reward a user for viewed video content based on presenting video content to a user, assigning the user rewards generated based on the value of the video portion viewed, and automatically presenting the user with marketplace credit to spend the rewards.

FIG. 1 depicts an exemplary operational scenario wherein a viewer uses an exemplary rewarded viewing video distribution system configured to reward a user for viewed video content based on presenting video content to a user, assigning the user rewards generated based on the value of the video portion viewed, and automatically presenting the user with marketplace credit to spend the rewards. In FIG. 1, the viewer 105 earns rewards for video content viewed on the viewer's mobile device 110. In the depicted example, the viewer's mobile device 110 is communicatively and operably coupled with the network cloud 115. In the illustrated embodiment, the depicted publisher's site hosts the rewarded viewing system 120, also communicatively and operably coupled with the network cloud 115. In the depicted example, the rewarded viewing system 120 hosts various multimedia content including video frames 125. In the illustrated embodiment, the viewer's mobile device 110 streams the video frames 125 from the rewarded viewing system 120 via the rewarded viewing sdk 130 and the video player 135 hosted on the rewarded viewing system 120. In the depicted example, the video player 135 hosted on the rewarded viewing system 120 is presented to the viewer 105 as the video player display 140 on the viewer 105 mobile device 110. In the illustrated example, the video frames 125 are presented to the viewer 105 on the video player display 140. In the depicted embodiment, the rewarded viewing sdk 130 is hosted on the rewarded viewing system 120. In various embodiments, the rewarded viewing sdk 130 may be implemented as a plug-in to the video player 135. In various designs, the rewarded viewing sdk 130 may be implemented in the viewer's mobile device 110. In the depicted example, the rewarded viewing sdk 130 and the video player 135 process the video frames 125 such that the portion of the video frames 125 presented on the video player display 140 are confirmed as viewed. In the depicted embodiment, the video frames 125 viewed video portion confirmations 145 are ingested via the rewarded viewing API 150 into the rewarded viewing module 155 communicatively and operably coupled with the network cloud 115. In the illustrated embodiment, the rewarded viewing module 155 associates the viewed video portion confirmations 145 with rewards 160 assigned to the viewer 105 in the viewer accounts database 165. In the depicted example, the campaigns database 170 maintains reward inventory allocated to various rewarded viewing campaigns. In the illustrated example, the rewards 160 assigned to the viewer 105 are automatically made available to the user 105 to be spent via the rewards spending gateway 180 communicatively and operably coupled with the network cloud 115. In the depicted example, the publisher 185 monitors and controls the exemplary rewarded viewing campaign via the rewarded viewing administration user interface 190.

Figure 2:
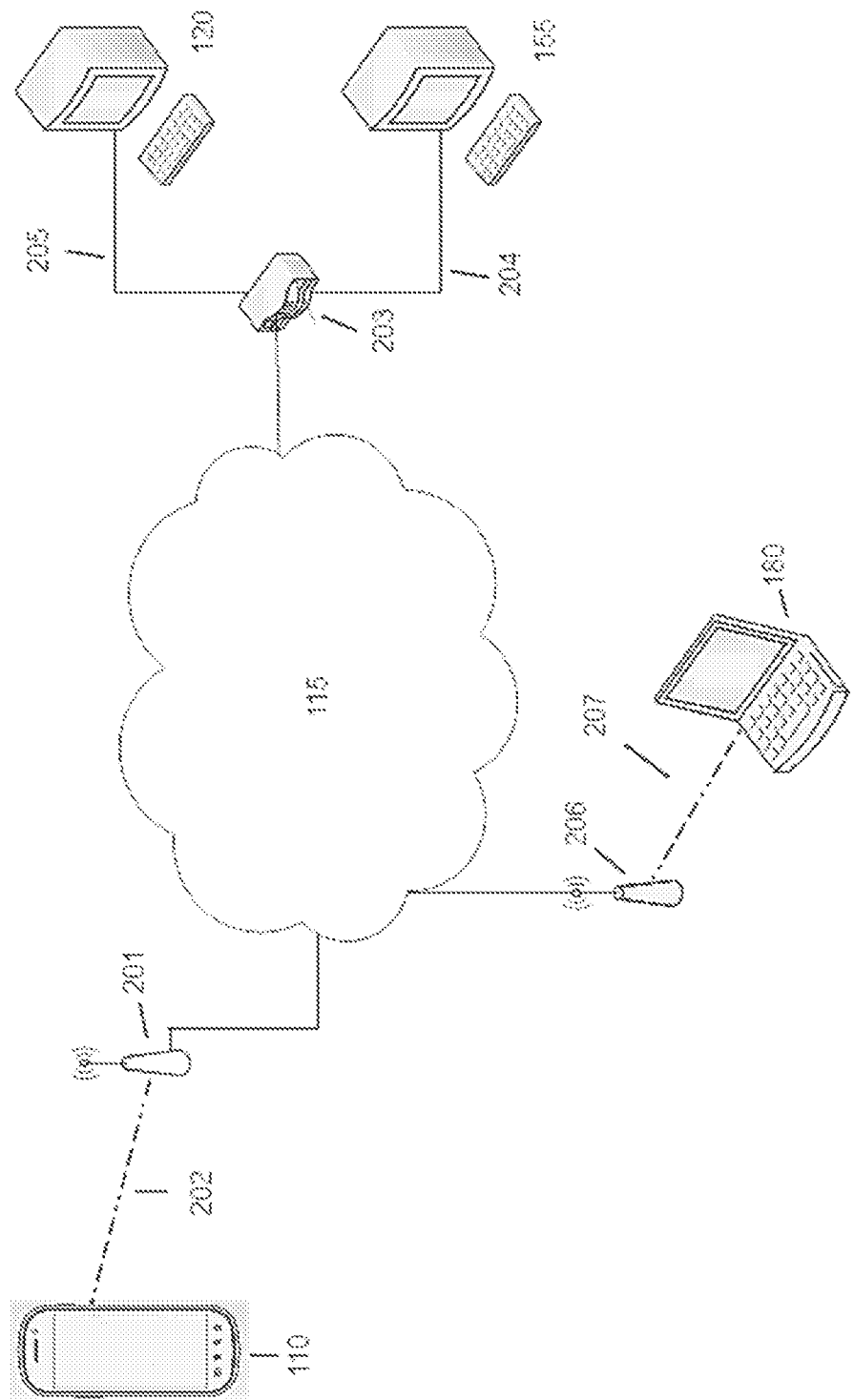
FIG. 2 depicts a schematic view of an exemplary rewarded viewing video network configured to reward a user for viewed video content based on presenting video content to a user, assign the user rewards generated based on the value of the video portion viewed, and automatically present the user with marketplace credit to spend the rewards.

FIG. 2 depicts a schematic view of an exemplary rewarded viewing video network configured to reward a user for viewed video content based on presenting video content to a user, assigning the user rewards generated based on the value of the video portion viewed, and automatically presenting the user with marketplace credit to spend the rewards. In FIG. 2, according to an exemplary embodiment of the present disclosure, data may be transferred to the system, stored by the system and/or transferred by the system to users of the system across local area networks (LANs) or wide area networks (WANs). In accordance with various embodiments, the system may include numerous servers, data mining hardware, computing devices, or any combination thereof, communicatively connected across one or more LANs and/or WANs. One of ordinary skill in the art would appreciate that there are numerous manners in which the system could be configured, and embodiments of the present disclosure are contemplated for use with any configuration. Referring to FIG. 2, a schematic overview of a system in accordance with an embodiment of the present disclosure is shown. In the depicted embodiment, an exemplary system includes the exemplary mobile computing device 110 configured to permit a user to earn rewards for video content viewed on the mobile device using the rewarded viewing system 120 configured to present video content to a user and permit the user to earn rewards associated to viewed portions of the video content. In the illustrated embodiment, the rewarded viewing system 120 is a computing device configured to facilitate streaming multimedia network service. In the depicted embodiment, the rewarded viewing module 155 is a computing device configured to assign the user rewards generated based on the value of the video portion viewed, and automatically present the user with marketplace credit to spend the rewards. In the depicted example, the mobile computing device 110 is a smart phone. In the illustrated embodiment, the mobile computing device 110 is communicatively and operably coupled by the wireless access point 201 and the wireless link 202 with the network cloud 115 (e.g., the Internet) to send, retrieve, or manipulate information in storage devices, servers, and network components, and exchange information with various other systems and devices via the network cloud 115. In the depicted example, the illustrative system includes the router 203 configured to communicatively and operably couple the rewarded viewing module 155 to the network cloud 115 via the communication link 204. In the illustrated example, the router 203 also communicatively and operably couples the rewarded viewing system 120 to the network cloud 115 via the communication link 205. In the depicted embodiment, the rewards spending gateway 180 is communicatively and operably coupled with the network cloud 115 by the wireless access point 206 and the wireless communication link 207. In various examples, one or more of: the mobile computing device 110, rewarded viewing system 120, rewarded viewing module 155, or rewards spending gateway 180 may include an application server configured to store or provide access to information used by the system. In various embodiments, one or more application server may retrieve or manipulate information in storage devices and exchange information through the network cloud 115. In some examples, one or more of: the mobile computing device 110, rewarded viewing system 120, rewarded viewing module 155, or rewards spending gateway 180 may include various applications implemented as processor-executable program instructions. In some embodiments, various processor-executable program instruction applications may also be used to manipulate information stored remotely and process and analyze data stored remotely across the network cloud 115 (e.g., the Internet). According to an exemplary embodiment, as shown in FIG. 2, exchange of information through the network cloud 115 or other network may occur through one or more high speed connections. In some cases, high speed connections may be over-the-air (OTA), passed through networked systems, directly connected to one or more network cloud 115 or directed through one or more router. In various implementations, one or more router may be optional, and other embodiments in accordance with the present disclosure may or may not utilize one or more router. One of ordinary skill in the art would appreciate that there are numerous ways any or all of the depicted devices may connect with the network cloud 115 for the exchange of information, and embodiments of the present disclosure are contemplated for use with any method for connecting to networks for the purpose of exchanging information. Further, while this application may refer to high speed connections, embodiments of the present disclosure may be utilized with connections of any useful speed. In an illustrative example, components or modules of the system may connect to one or more of: the mobile computing device 110, rewarded viewing system 120, rewarded viewing module 155, or rewards spending gateway 180 via the network cloud 115 or other network in numerous ways. For instance, a component or module may connect to the system i) through a computing device directly connected to the network cloud 115, ii) through a computing device connected to the network cloud 115 through a routing device, or iii) through a computing device connected to a wireless access point. One of ordinary skill in the art will appreciate that there are numerous ways that a component or module may connect to a device via network cloud 115 or other network, and embodiments of the present disclosure are contemplated for use with any network connection method. In various examples, one or more of: the mobile computing device 110, rewarded viewing system 120, rewarded viewing module 155, or rewards spending gateway 180 could be comprised of a personal computing device, such as a smartphone, tablet computer, wearable computing device, cloud-based computing device, virtual computing device, or desktop computing device, configured to operate as a host for other computing devices to connect to. In some examples, one or more communications means of the system may be any circuitry or other means for communicating data over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Figure 3:
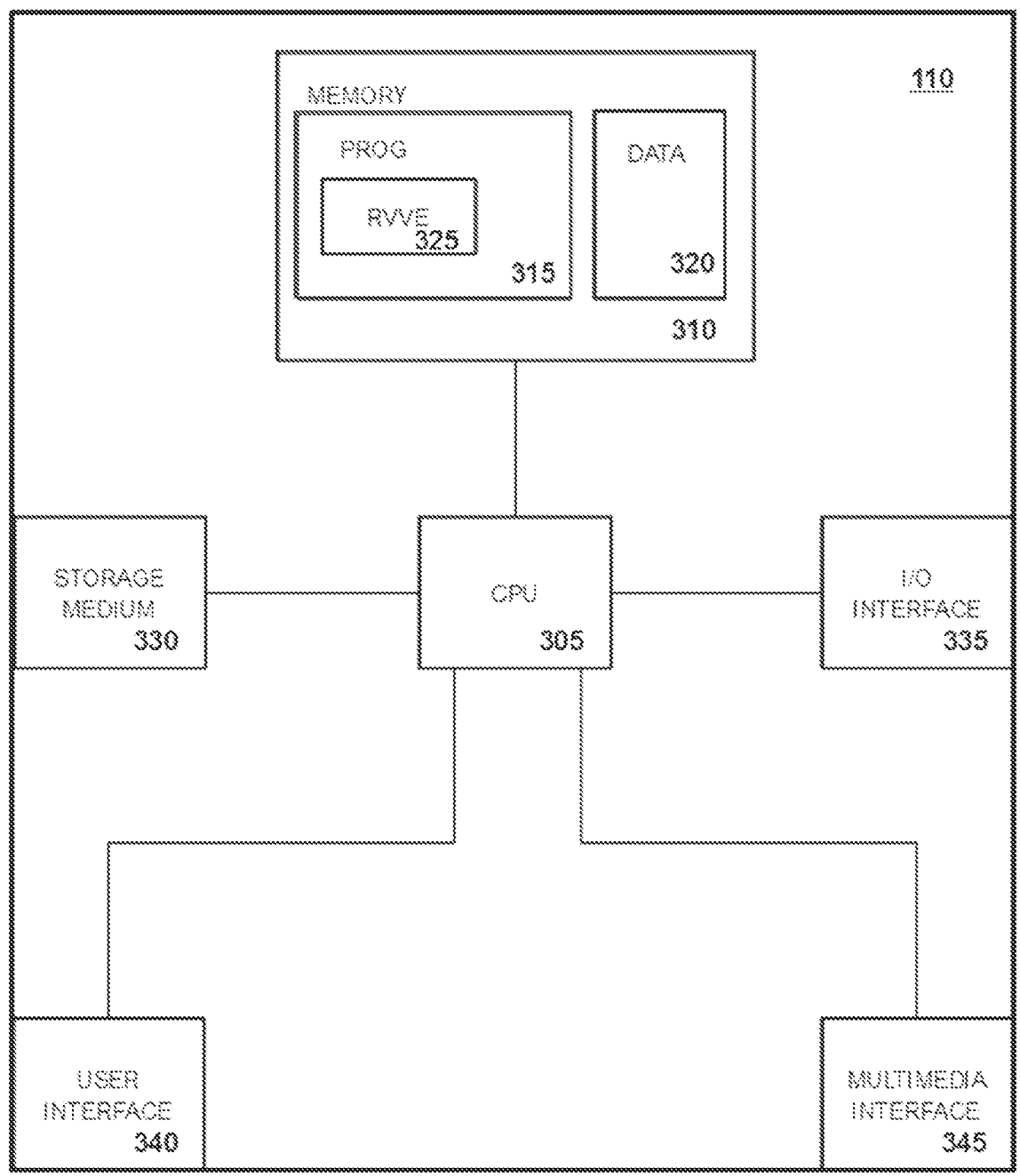
FIG. 3 depicts a structural view of an exemplary mobile computing device configured to permit a user to earn rewards for video content viewed on the mobile device.

FIG. 3 depicts a structural view of an exemplary mobile computing device configured to permit a user to earn rewards for video content viewed on the mobile device. In FIG. 3, the block diagram of the exemplary mobile computing device 110 includes processor 305 and memory 310. The processor 305 is in electrical communication with the memory 310. The depicted memory 310 includes program memory 315 and data memory 320. The depicted program memory 315 includes processor-executable program instructions implementing the RVVE (Reward Video Viewing Engine) 325. In some embodiments, the illustrated program memory 315 may include processor-executable program instructions configured to implement an OS (Operating System). In various embodiments, the OS may include processor executable program instructions configured to implement various operations when executed by the processor 305. In some embodiments, the OS may be omitted. In some embodiments, the illustrated program memory 315 may include processor-executable program instructions configured to implement various Application Software. In various embodiments, the Application Software may include processor executable program instructions configured to implement various operations when executed by the processor 305. In some embodiments, the Application Software may be omitted. In the depicted embodiment, the processor 305 is communicatively and operably coupled with the storage medium 330. In the depicted embodiment, the processor 305 is communicatively and operably coupled with the I/O (Input/Output) module 335. In the depicted embodiment, the I/O module 335 includes a network interface. In various implementations, the network interface may be a wireless network interface. In some designs, the network interface may be a Wi-Fi interface. In some embodiments, the network interface may be a Bluetooth interface. In an illustrative example, the mobile computing device 110 may include more than one network interface. In some designs, the network interface may be a wireline interface. In some designs, the network interface may be omitted. In the depicted embodiment, the processor 305 is communicatively and operably coupled with the user interface 340. In various implementations, the user interface 340 may be adapted to receive input from a user or send output to a user. In some embodiments, the user interface 340 may be adapted to an input-only or output-only user interface mode. In various implementations, the user interface 340 may include an imaging display. In some embodiments, the user interface 340 may include an audio interface. In some designs, the audio interface may include an audio input. In various designs, the audio interface may include an audio output. In some implementations, the user interface 340 may be touch-sensitive. In some designs, the mobile computing device 110 may include an accelerometer operably coupled with the processor 305. In various embodiments, the mobile computing device 110 may include a GPS module operably coupled with the processor 305. In an illustrative example, the mobile computing device 110 may include a magnetometer operably coupled with the processor 305. In some embodiments, the user interface 340 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 310 may contain processor executable program instruction modules configurable by the processor 305 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 310 may contain processor executable program instruction modules configurable by the processor 305 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 305 is communicatively and operably coupled with the multimedia interface 345. In the illustrated embodiment, the multimedia interface 345 includes interfaces adapted to input and output of audio, video, and image data. In some embodiments, the multimedia interface 345 may include one or more still image camera or video camera. In various designs, the multimedia interface 345 may include one or more microphone. In some implementations, the multimedia interface 345 may include a wireless communication means configured to operably and communicatively couple the multimedia interface 345 with a multimedia data source or sink external to the mobile computing device 110. In various designs, the multimedia interface 345 may include interfaces adapted to send, receive, or process encoded audio or video. In various embodiments, the multimedia interface 345 may include one or more video, image, or audio encoder. In various designs, the multimedia interface 345 may include one or more video, image, or audio decoder. In various implementations, the multimedia interface 345 may include interfaces adapted to send, receive, or process one or more multimedia stream. In various implementations, the multimedia interface 345 may include a GPU. In some embodiments, the multimedia interface 345 may be omitted. Useful examples of the illustrated mobile computing device 110 include, but are not limited to, personal computers, servers, tablet PCs, smartphones, or other computing devices. In some embodiments, multiple mobile computing device 110 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary mobile computing device 110 design may be realized in a distributed implementation. In an illustrative example, some mobile computing device 110 designs may be partitioned between a client device, such as, for example, a phone, and, a more powerful server system, as depicted, for example, in FIG. 2. In various designs, a mobile computing device 110 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary mobile computing device 110 may be configured to operate on a device with less processing power, such as, for example, various gaming consoles, which may not have sufficient processor power, or a suitable CPU architecture, to adequately support mobile computing device 110. Various embodiment designs configured to operate on a such a device with reduced processor power may work in conjunction with a more powerful server system.

Figure 4:
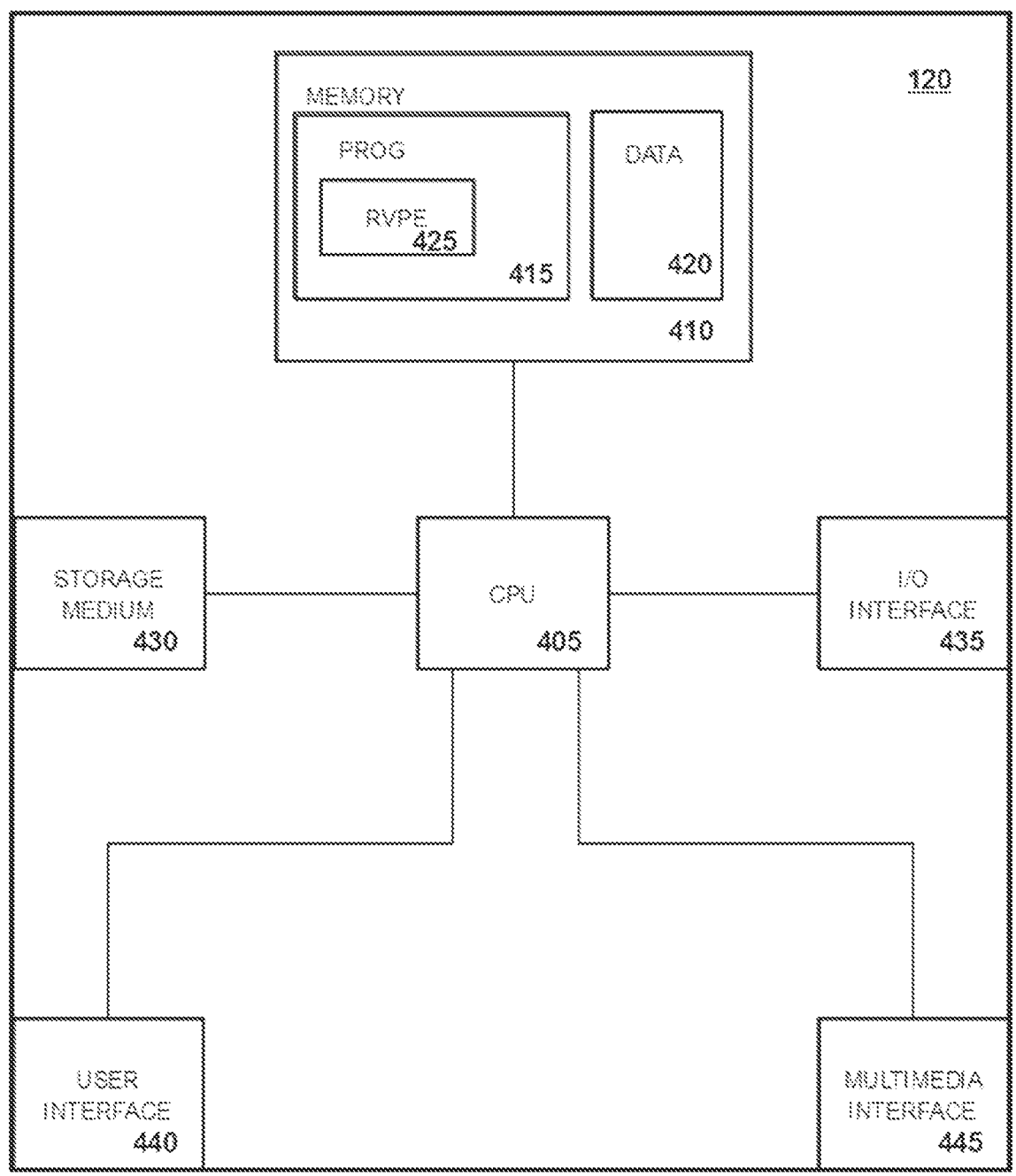
FIG. 4 depicts a structural view of an exemplary rewarded viewing system configured to present video content to a user and permit the user to earn rewards associated to viewed portions of the video content.

FIG. 4 depicts a structural view of an exemplary rewarded viewing system configured to present video content to a user and permit the user to earn rewards associated to viewed portions of the video content. In FIG. 4, the block diagram of the exemplary rewarded viewing system 120 includes processor 405 and memory 410. The processor 405 is in electrical communication with the memory 410. The depicted memory 410 includes program memory 415 and data memory 420. The depicted program memory 415 includes processor-executable program instructions implementing the RVPE (Reward Video Player Engine) 425. In some embodiments, the illustrated program memory 415 may include processor-executable program instructions configured to implement an OS (Operating System). In various embodiments, the OS may include processor executable program instructions configured to implement various operations when executed by the processor 405. In some embodiments, the OS may be omitted. In some embodiments, the illustrated program memory 415 may include processor-executable program instructions configured to implement various Application Software. In various embodiments, the Application Software may include processor executable program instructions configured to implement various operations when executed by the processor 405. In some embodiments, the Application Software may be omitted. In the depicted embodiment, the processor 405 is communicatively and operably coupled with the storage medium 430. In the depicted embodiment, the processor 405 is communicatively and operably coupled with the I/O (Input/Output) module 435. In the depicted embodiment, the I/O module 435 includes a network interface. In various implementations, the network interface may be a wireless network interface. In some designs, the network interface may be a Wi-Fi interface. In some embodiments, the network interface may be a Bluetooth interface. In an illustrative example, the rewarded viewing system 120 may include more than one network interface. In some designs, the network interface may be a wireline interface. In some designs, the network interface may be omitted. In the depicted embodiment, the processor 405 is communicatively and operably coupled with the user interface 440. In various implementations, the user interface 440 may be adapted to receive input from a user or send output to a user. In some embodiments, the user interface 440 may be adapted to an input-only or output-only user interface mode. In various implementations, the user interface 440 may include an imaging display. In some embodiments, the user interface 440 may include an audio interface. In some designs, the audio interface may include an audio input. In various designs, the audio interface may include an audio output. In some implementations, the user interface 440 may be touch-sensitive. In some designs, the rewarded viewing system 120 may include an accelerometer operably coupled with the processor 405. In various embodiments, the rewarded viewing system 120 may include a GPS module operably coupled with the processor 405. In an illustrative example, the rewarded viewing system 120 may include a magnetometer operably coupled with the processor 405. In some embodiments, the user interface 440 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 405 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 410 may contain processor executable program instruction modules configurable by the processor 405 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 405 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 410 may contain processor executable program instruction modules configurable by the processor 405 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 405 is communicatively and operably coupled with the multimedia interface 445. In the illustrated embodiment, the multimedia interface 445 includes interfaces adapted to input and output of audio, video, and image data. In some embodiments, the multimedia interface 445 may include one or more still image camera or video camera. In various designs, the multimedia interface 445 may include one or more microphone. In some implementations, the multimedia interface 445 may include a wireless communication means configured to operably and communicatively couple the multimedia interface 445 with a multimedia data source or sink external to the rewarded viewing system 120. In various designs, the multimedia interface 445 may include interfaces adapted to send, receive, or process encoded audio or video. In various embodiments, the multimedia interface 445 may include one or more video, image, or audio encoder. In various designs, the multimedia interface 445 may include one or more video, image, or audio decoder. In various implementations, the multimedia interface 445 may include interfaces adapted to send, receive, or process one or more multimedia stream. In various implementations, the multimedia interface 445 may include a GPU. In some embodiments, the multimedia interface 445 may be omitted. Useful examples of the illustrated rewarded viewing system 120 include, but are not limited to, personal computers, servers, tablet PCs, smartphones, or other computing devices. In some embodiments, multiple rewarded viewing system 120 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary rewarded viewing system 120 design may be realized in a distributed implementation. In an illustrative example, some rewarded viewing system 120 designs may be partitioned between a client device, such as, for example, a phone, and, a more powerful server system, as depicted, for example, in FIG. 2. In various designs, a rewarded viewing system 120 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary rewarded viewing system 120 may be configured to operate on a device with less processing power, such as, for example, various gaming consoles, which may not have sufficient processor power, or a suitable CPU architecture, to adequately support rewarded viewing system 120. Various embodiment designs configured to operate on a such a device with reduced processor power may work in conjunction with a more powerful server system.

Figure 5:
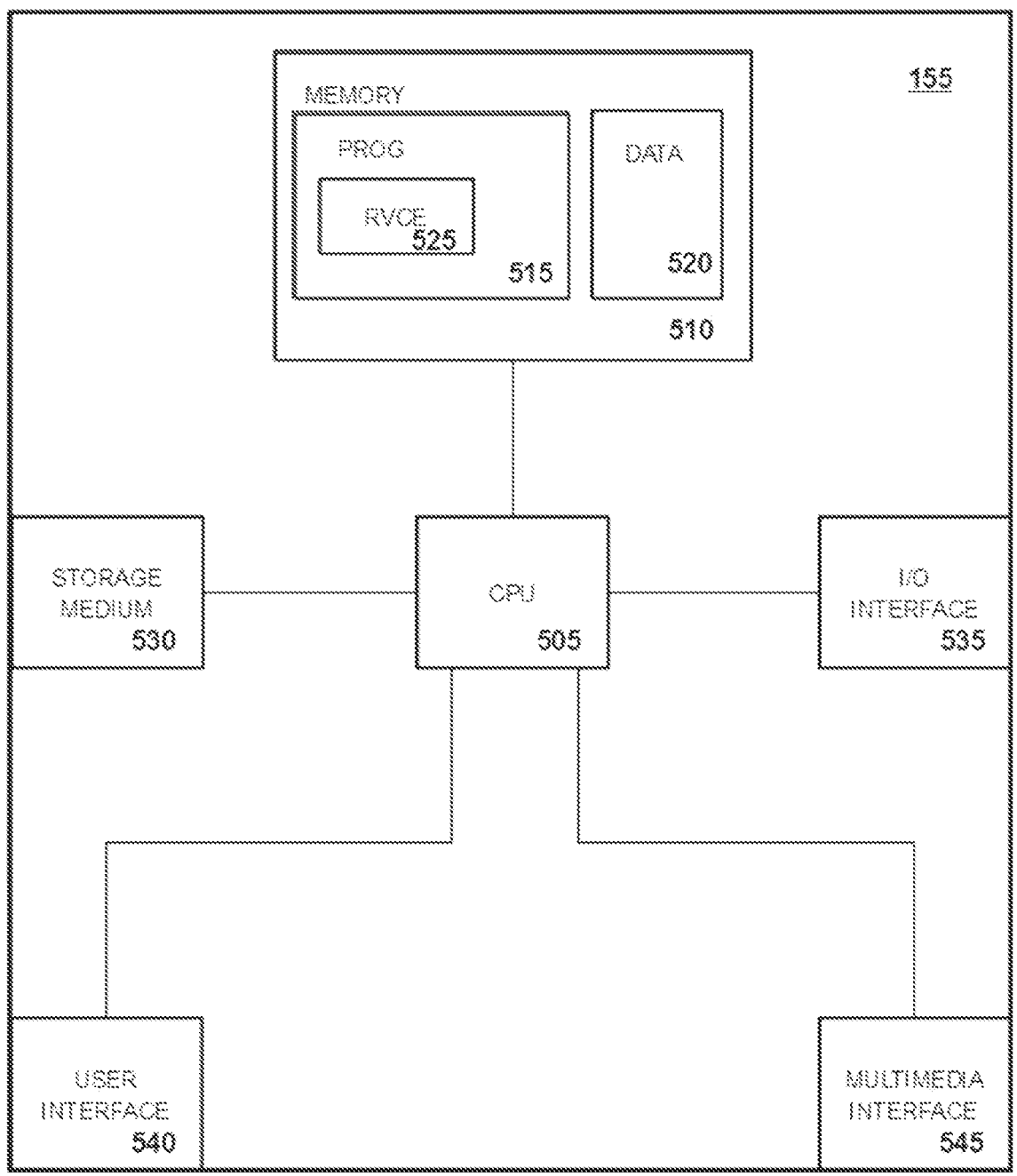
FIG. 5 depicts a structural view of an exemplary rewarded viewing module configured to assign the user rewards generated based on the value of the video portion viewed, and automatically present the user with marketplace credit to spend the rewards.

FIG. 5 depicts a structural view of an exemplary rewarded viewing module configured to assign the user rewards generated based on the value of the video portion viewed, and automatically present the user with marketplace credit to spend the rewards. In FIG. 5, the block diagram of the exemplary rewarded viewing module 155 includes processor 505 and memory 510. The processor 505 is in electrical communication with the memory 510. The depicted memory 510 includes program memory 515 and data memory 520. The depicted program memory 515 includes processor-executable program instructions implementing the RVCE (Reward Video Campaign Engine) 525. In some embodiments, the illustrated program memory 515 may include processor-executable program instructions configured to implement an OS (Operating System). In various embodiments, the OS may include processor executable program instructions configured to implement various operations when executed by the processor 505. In some embodiments, the OS may be omitted. In some embodiments, the illustrated program memory 515 may include processor-executable program instructions configured to implement various Application Software. In various embodiments, the Application Software may include processor executable program instructions configured to implement various operations when executed by the processor 505. In some embodiments, the Application Software may be omitted. In the depicted embodiment, the processor 505 is communicatively and operably coupled with the storage medium 530. In the depicted embodiment, the processor 505 is communicatively and operably coupled with the I/O (Input/Output) module 535. In the depicted embodiment, the I/O module 535 includes a network interface. In various implementations, the network interface may be a wireless network interface. In some designs, the network interface may be a Wi-Fi interface. In some embodiments, the network interface may be a Bluetooth interface. In an illustrative example, the rewarded viewing module 155 may include more than one network interface. In some designs, the network interface may be a wireline interface. In some designs, the network interface may be omitted. In the depicted embodiment, the processor 505 is communicatively and operably coupled with the user interface 540. In various implementations, the user interface 540 may be adapted to receive input from a user or send output to a user. In some embodiments, the user interface 540 may be adapted to an input-only or output-only user interface mode. In various implementations, the user interface 540 may include an imaging display. In some embodiments, the user interface 540 may include an audio interface. In some designs, the audio interface may include an audio input. In various designs, the audio interface may include an audio output. In some implementations, the user interface 540 may be touch-sensitive. In some designs, the rewarded viewing module 155 may include an accelerometer operably coupled with the processor 505. In various embodiments, the rewarded viewing module 155 may include a GPS module operably coupled with the processor 505. In an illustrative example, the rewarded viewing module 155 may include a magnetometer operably coupled with the processor 505. In some embodiments, the user interface 540 may include an input sensor array. In various implementations, the input sensor array may include one or more imaging sensor. In various designs, the input sensor array may include one or more audio transducer. In some implementations, the input sensor array may include a radio-frequency detector. In an illustrative example, the input sensor array may include an ultrasonic audio transducer. In some embodiments, the input sensor array may include image sensing subsystems or modules configurable by the processor 505 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In various implementations, the depicted memory 510 may contain processor executable program instruction modules configurable by the processor 505 to be adapted to provide image input capability, image output capability, image sampling, spectral image analysis, correlation, autocorrelation, Fourier transforms, image buffering, image filtering operations including adjusting frequency response and attenuation characteristics of spatial domain and frequency domain filters, image recognition, pattern recognition, or anomaly detection. In some embodiments, the input sensor array may include audio sensing subsystems or modules configurable by the processor 505 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In various implementations, the depicted memory 510 may contain processor executable program instruction modules configurable by the processor 505 to be adapted to provide audio input capability, audio output capability, audio sampling, spectral audio analysis, correlation, autocorrelation, Fourier transforms, audio buffering, audio filtering operations including adjusting frequency response and attenuation characteristics of temporal domain and frequency domain filters, audio pattern recognition, or anomaly detection. In the depicted embodiment, the processor 505 is communicatively and operably coupled with the multimedia interface 545. In the illustrated embodiment, the multimedia interface 545 includes interfaces adapted to input and output of audio, video, and image data. In some embodiments, the multimedia interface 545 may include one or more still image camera or video camera. In various designs, the multimedia interface 545 may include one or more microphone. In some implementations, the multimedia interface 545 may include a wireless communication means configured to operably and communicatively couple the multimedia interface 545 with a multimedia data source or sink external to the rewarded viewing module 155. In various designs, the multimedia interface 545 may include interfaces adapted to send, receive, or process encoded audio or video. In various embodiments, the multimedia interface 545 may include one or more video, image, or audio encoder. In various designs, the multimedia interface 545 may include one or more video, image, or audio decoder. In various implementations, the multimedia interface 545 may include interfaces adapted to send, receive, or process one or more multimedia stream. In various implementations, the multimedia interface 545 may include a GPU. In some embodiments, the multimedia interface 545 may be omitted. Useful examples of the illustrated rewarded viewing module 155 include, but are not limited to, personal computers, servers, tablet PCs, smartphones, or other computing devices. In some embodiments, multiple rewarded viewing module 155 devices may be operably linked to form a computer network in a manner as to distribute and share one or more resources, such as clustered computing devices and server banks/farms. Various examples of such general-purpose multi-unit computer networks suitable for embodiments of the disclosure, their typical configuration and many standardized communication links are well known to one skilled in the art, as explained in more detail in the foregoing FIG. 2 description. In some embodiments, an exemplary rewarded viewing module 155 design may be realized in a distributed implementation. In an illustrative example, some rewarded viewing module 155 designs may be partitioned between a client device, such as, for example, a phone, and, a more powerful server system, as depicted, for example, in FIG. 2. In various designs, a rewarded viewing module 155 partition hosted on a PC or mobile device may choose to delegate some parts of computation, such as, for example, machine learning or deep learning, to a host server. In some embodiments, a client device partition may delegate computation-intensive tasks to a host server to take advantage of a more powerful processor, or to offload excess work. In an illustrative example, some devices may be configured with a mobile chip including an engine adapted to implement specialized processing, such as, for example, neural networks, machine learning, artificial intelligence, image recognition, audio processing, or digital signal processing. In some embodiments, such an engine adapted to specialized processing may have sufficient processing power to implement some features. However, in some embodiments, an exemplary rewarded viewing module 155 may be configured to operate on a device with less processing power, such as, for example, various gaming consoles, which may not have sufficient processor power, or a suitable CPU architecture, to adequately support rewarded viewing module 155. Various embodiment designs configured to operate on a such a device with reduced processor power may work in conjunction with a more powerful server system.

Figure 6:
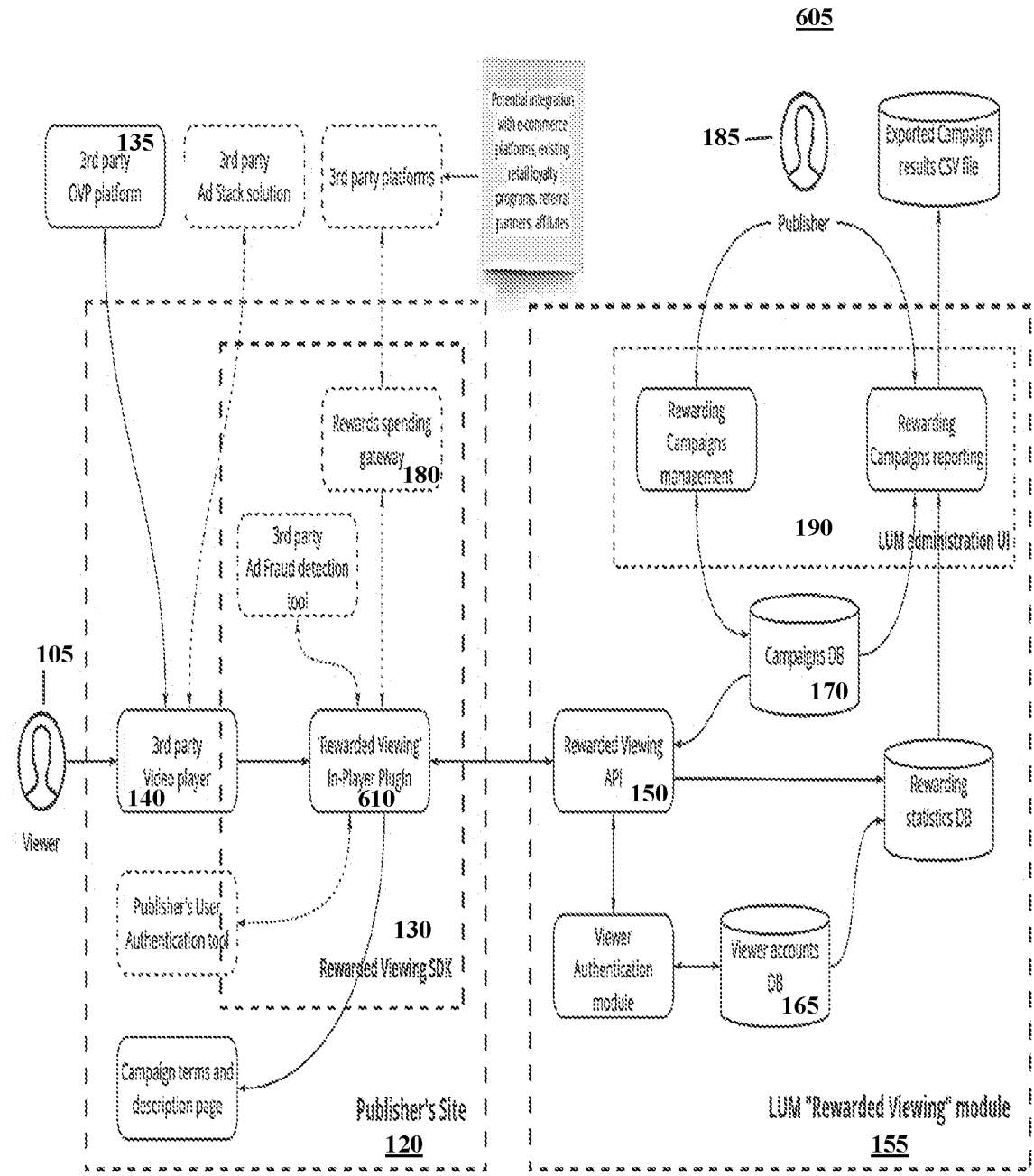
FIG. 6 depicts a structural view of an exemplary rewarded viewing architecture.

FIG. 6 depicts a structural view of an exemplary rewarded viewing architecture. In the example depicted by FIG. 6, the exemplary rewarded viewing architecture 605 includes the exemplary rewarded viewing system 120, also depicted at least in FIGS. 1, 2, and 4. In the illustrated embodiment rewarded viewing architecture 605, the rewarded viewing system 120 is communicatively and operably coupled via the rewarded viewing API with the exemplary rewarded viewing module 155, depicted at least in FIGS. 1, 2, and 5.

In the embodiment depicted by FIG. 6, the rewarded viewing system 120 includes the 'Rewarded Viewing' In-Player Plugin 610 activated in the $3^{rd}$ party video player 140. In the depicted example, the $3^{rd}$ party video player 140 embedded in the publisher's site is hosted by the $3^{rd}$ party OVP platform 135. In the illustrated embodiment, the rewarded viewing system 120 presents the publisher's video content to the viewer 105 via the $3^{rd}$ party video player 140. In the depicted embodiment, the 'Rewarded Viewing' In-Player Plugin 610 identifies the video content portion viewed by the viewer 105. In the illustrated example, the viewer is presented with rewards spendable via the rewards spending gateway 180. In the illustrated embodiment, the 'Rewarded Viewing' In-Player Plugin 610 is implemented using the rewarded viewing sdk 130. In various embodiments, an exemplary 'Rewarded Viewing' In-Player Plugin may be implemented as processor executable program instructions accessible to a processor executing as part of the viewer's computing device.

In the embodiment illustrated by FIG. 6, the rewarded viewing module 155 receives an indication of the video portion viewed via the rewarded viewing API 150. In the depicted embodiment, the rewarded viewing module 155 determines the value of the video portion viewed based on associating a viewer 105 record in the viewer accounts database 165 to a promotional video campaign record in the campaigns database 170. In the illustrated embodiment, the rewarded viewing module 155 assigns rewards to the viewer 105 based on the value of the viewed portion of the promotional campaign video. In the depicted embodiment, the publisher 185 manages and monitors the rewarded viewing campaign via the rewarded viewing administration user interface 190.

In the embodiment illustrated by FIG. 6, the exemplary Rewarded Viewing Player-side sdk 130 configured in the rewarded viewing system 120 includes components used to construct an embodiment 'Rewarded Viewing' In-Player PlugIn. In an illustrative example, using components provided along with the module SDK (or integrating directly), a publisher may embed an embodiment 'Rewarded Viewing' PlugIn into a Video Player used on the publisher's website. In various scenarios, an embodiment 'Rewarded Viewing' PlugIn embedded into a Video Player already used on the publisher's website may allow the Player to interact with an exemplary LUM "Rewarded Viewing" module. For example, in various embodiment scenarios, such a 'Rewarded Viewing' PlugIn embedded into a Video Player may permit a user to:

- Check whether rewarding campaigns are available for this site (Domain) at the moment
- Display a Reward Indicator in the Player, when the Viewer earns rewarding points by watching vast part of the video (in the depicted example, 75% threshold is set up) or watching Ads (depends on the active rewarding campaigns)
- Display a Sign-up/Sign-in form in order to claim the reward (in a slide-out panel in the Player)
- Display user's earned rewards and the campaign's progress for signed-in Viewers
- Show a link to the campaign terms and details page
- Allow the Viewer to spend his earned rewards for partners services or products if any integrated via Rewards spending gateway In the embodiment depicted by FIG. 6, the exemplary rewards spending gateway 180 configured in the rewarded viewing system 120 is configured to permit not only rewarding viewers, but also allows viewers to spend their rewards. In various embodiments, exemplary rewards spending gateway 180 features and functionality may be available as a part of the SDK. In some embodiments, illustrative rewards spending gateway features and functionality may be integrated directly into a player configurable for use on a publisher's site. In an example illustrative of various embodiments' features, a publisher's site may connect 3rd party partner's platforms like e-commerce platforms, existing retail loyalty programs, referral partners, or affiliates through an exemplary ready-for-integration rewards spending gateway. In various examples, an embodiment rewards spending gateway may allow a viewer to exchange rewards for special offers from the partners, for services, products, or opportunities to take part in prize draws.

In the embodiment illustrated by FIG. 6, the exemplary rewarded viewing sdk 130 configured in the rewarded viewing system 120 includes interfaces permitting rewarded viewing integration to an illustrative 3rd party Ad Fraud detection tool. Such 3rd party Ad Fraud detection tool integration may help avoid rewarding for Ads in fraud cases, in addition to avoiding rewarding for fake views (for example, fake views by bots).

In the embodiment depicted by FIG. 6, the illustrative rewarded viewing sdk 130 configured in the rewarded viewing system 120 includes interfaces enabling integration to a publisher's existing User Authentication mechanism already in use on the publisher's site. In various exemplary scenarios, such rewarded viewing integration with a publisher's existing User Authentication may help a viewer avoid double authentication for claiming and spending rewards.

In the embodiment illustrated by FIG. 6, the exemplary rewarded viewing API 150 configured in the rewarded viewing module 155 is designed to build an integration of an illustrative 'Rewarded Viewing' In-Player PlugIn embedded into a publisher's Video Player with an exemplary LUM "Rewarded Viewing" module. In the illustrated embodiment, the rewarded viewing API 150 is configured to use WebSocket Client-Server communication.

In the embodiment illustrated by FIG. 6, the exemplary rewarded viewing module 155 includes a Viewer Authentication module designed to identify viewers and fulfill viewer authentication flows. In an illustrative example, an embodiment rewarded viewing module 155 configured with a Viewer Authentication module may include features or operations such as:

Frictionless sign-up\sign-in
  There are only two obligatory fields for the user to complete initial registration: email and password. Right after signing up user is offered to confirm email and next step will be filling up detailed profile info and providing necessary consents. Any of those steps can be skipped by the user and data can be edited/provided later. Signup is protected with captcha to prevent automated mass registrations.
User consent to terms
  The user is offered to provide the necessary agreements consent to get their video viewing reward, including Data Sharing consent—an agreement that allows an embodiment rewarded viewing player to share the user's data with the Publisher.
Forgot password/Password Reset
  The user is offered to enter email, a secret code is sent to email, entering secret code and new password completes password reset procedure. The feature is protected with captcha to prevent automated manipulations.
In case of integration with Publisher's User Authentication tool, this component will use a Single sign-on (SSO) approach, thus viewer will go through the authentication flow automatically in a silent mode.

In the embodiment depicted by FIG. 6, the exemplary rewarded viewing module 155 includes the illustrative Rewarded Viewing Administration User Interface (UI) 190. In the illustrated embodiment, to be able to use the Rewarded Viewing Administration UI 190, the publisher (Customer) 185 has to be registered in the LUM platform. In an example illustrative of LUM platform customer registration, the publisher 185 may sign up for access to a "rewarded viewing" module: ->Create a customer account (company, contact person, domain)->give the customer access to "rewarded viewing" module in LUM. In various examples, LUM platform customer registration allows the registered customer access to:

Rewarding Campaigns management
  Customer sets up rewarded viewing campaign per domain (Reward amount, Reward limit per viewer, Reward pool, Campaign start\end date, Restricted/allowed GEOs, Type of reward, and other parameters).
  Customer sets up CTAs in rewarded viewing campaign per domain
  Customer is able to save campaign as a draft, publish campaign, pause published campaign, un-pause published campaign, stop, archive & delete published campaign.
  Customer is able to test what a campaign will look like in a player before launching live on the customer's domain.
Rewarding Campaigns reports
  Customer is able to access rewarded viewing statistics/reporting as well as user data.
Distribution of rewards will be handled by Customer. For this purpose, the customer is permitted to be able to export the Campaign results into CSV file.

In the example depicted by FIG. 6, the exemplary rewarded viewing module 155 includes the illustrative Rewarded Viewing Database featuring the Viewer accounts database 165, the Campaigns database 170, and an exemplary rewarding statistics database.

Figure 7:
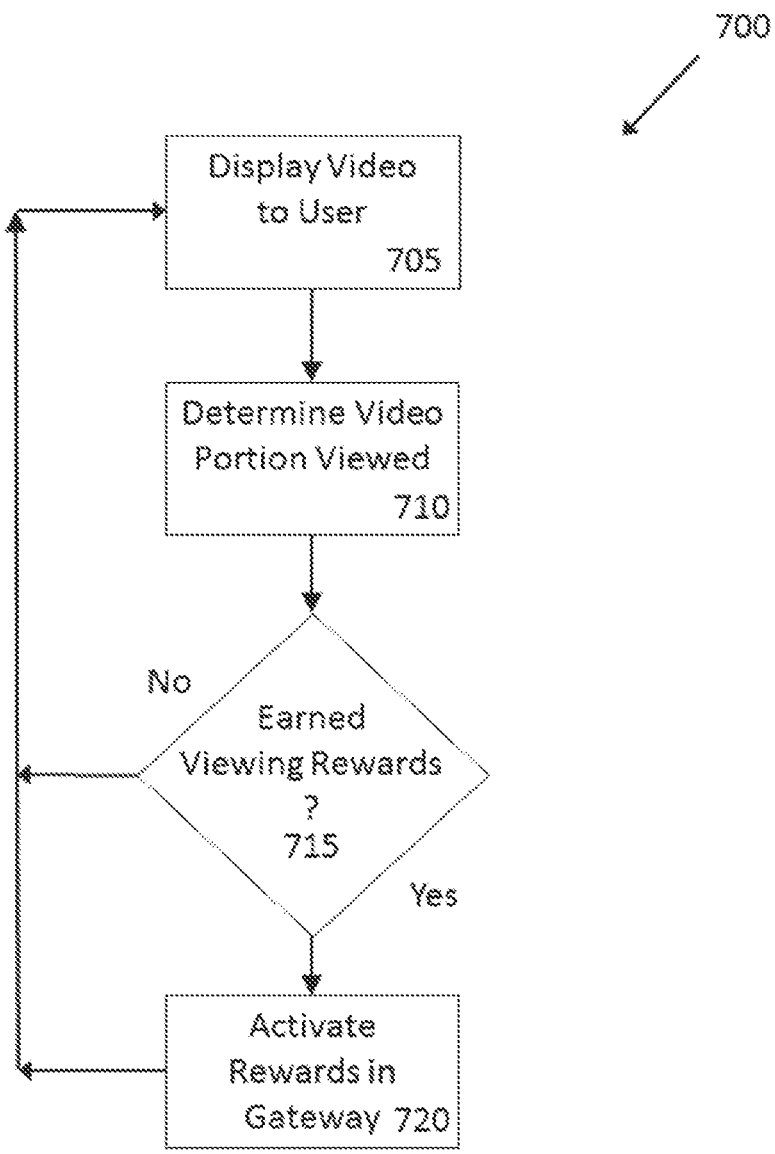
FIG. 7 depicts an exemplary process flow of an embodiment rewarded viewing plugin permitting a user to earn rewards associated to viewed video content.

FIG. 7 depicts an exemplary process flow of an embodiment rewarded viewing plugin permitting a user to earn rewards associated to viewed video content. The method depicted in FIG. 7 is given from the perspective of the RVPE (Reward Video Player Engine) 425 implemented via processor-executable program instructions executing on the rewarded viewing system 120 processor 405, depicted in FIG. 4. In various embodiments, the method depicted in FIG. 7 may also be understood as from the perspective of the RVVE (Reward Video Viewing Engine) 325 implemented via processor-executable program instructions executing on the mobile computing device 110 processor 305, depicted in FIG. 3. In the illustrated embodiment, the RVPE 425 executes as program instructions on the processor 405 configured in the RVPE 425 host rewarded viewing system 120, depicted in at least FIG. 1, FIG. 2, FIG. 4, and FIG. 6. In some embodiments, the RVPE 425 may execute as a cloud service communicatively and operatively coupled with system services, hardware resources, or software elements local to and/or external to the RVPE 425 host rewarded viewing system 120. The depicted method 700 begins with the processor 405 displaying video to a user. In various designs, the video may be processed to integrate accounting support with the video content, permitting viewed portion measurement by the processor 405. Then, the method continues at step 710 with the processor 405 determining the video portion viewed. In some implementations the processor 405 may determine the video portion viewed based on viewed portion accounting integrated with the video content. In various embodiments, the processor 405 may determine the viewed video portion as a percentage of the video. In some designs, the processor 405 may determine the viewed video portion based on display of specific advertisements embedded in the video content. The method continues at step 715 with the processor 405 performing a test to determine if the user earned rewards for viewing the video. In various implementations, the processor 405 may receive an indication of rewards earned via the rewarded viewing API 150, depicted in FIG. 6. Upon a determination by the processor 405 at step 715 the user earned rewards, the method continues at step 720 with the processor 405 activating the earned rewards in a rewards spending gateway, and the method continues at step 705. Upon a determination by the processor 405 at step 715 the user did not earn rewards, the method continues at step 705.

Figure 8:
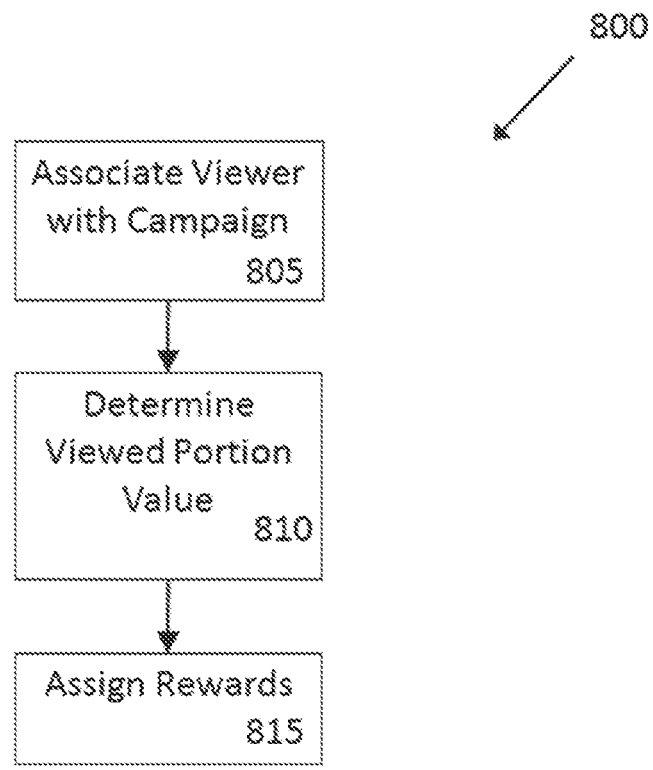
FIG. 8 depicts an exemplary process flow of an embodiment rewarded viewing module assigning rewards to a user for viewing video content.

FIG. 8 depicts an exemplary process flow of an embodiment rewarded viewing module assigning rewards to a user for viewing video content. The method depicted in FIG. 8 is given from the perspective of the RVCE (Reward Video Campaign Engine) 525 implemented via processor-executable program instructions executing on the rewarded viewing module 155 processor 505, depicted in FIG. 5. In the illustrated embodiment, the RVCE 525 executes as program instructions on the processor 505 configured in the RVCE 525 host rewarded viewing module 155, depicted in at least FIG. 1, FIG. 2, FIG. 5, and FIG. 6. In some embodiments, the RVCE 525 may execute as a cloud service communicatively and operatively coupled with system services, hardware resources, or software elements local to and/or external to the RVCE 525 host rewarded viewing module 155. The depicted method 800 begins with the processor 505 associating a viewer with a promotional video campaign. In various implementations, the processor 505 may receive an indication of user identity and identification of video content viewed via the rewarded viewing API 150, depicted in FIG. 6. The method continues at step 810 with the processor 505 determining the value of the viewed video portion. In some embodiments, the processor 505 may determine the viewed video portion value as a function of a predetermined threshold percentage. In an illustrative example, the processor 505 may determine a video has been viewed if a predetermined percentage of the video has been presented to the user's video player. For example, if the rewarded view threshold was configured to seventy-five percent, the processor 505 may determine the video has been viewed and calculate the viewed portion value equivalent to the entire video. The method continues at step 815 with the processor 505 assigning rewards to the user based on the value of the viewed video portion determined by the processor 505 at step 810. In various implementations, the processor 505 may indicate the rewards earned by the user via the rewarded viewing API 150, depicted in FIG. 6.

FIG. 9 depicts an illustrative tabular view of an exemplary rewarded viewing technology stack.

Figure 10A:
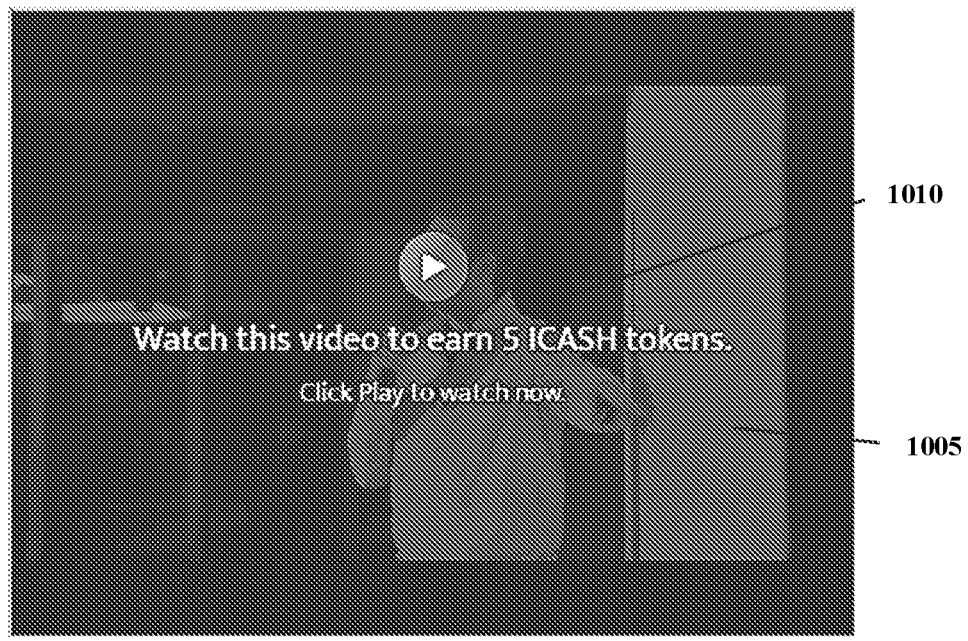
FIGS. 10A-10I together depict an illustrative rewarded viewing user interface in an exemplary rewarded viewing scenario.
Figure 10B:
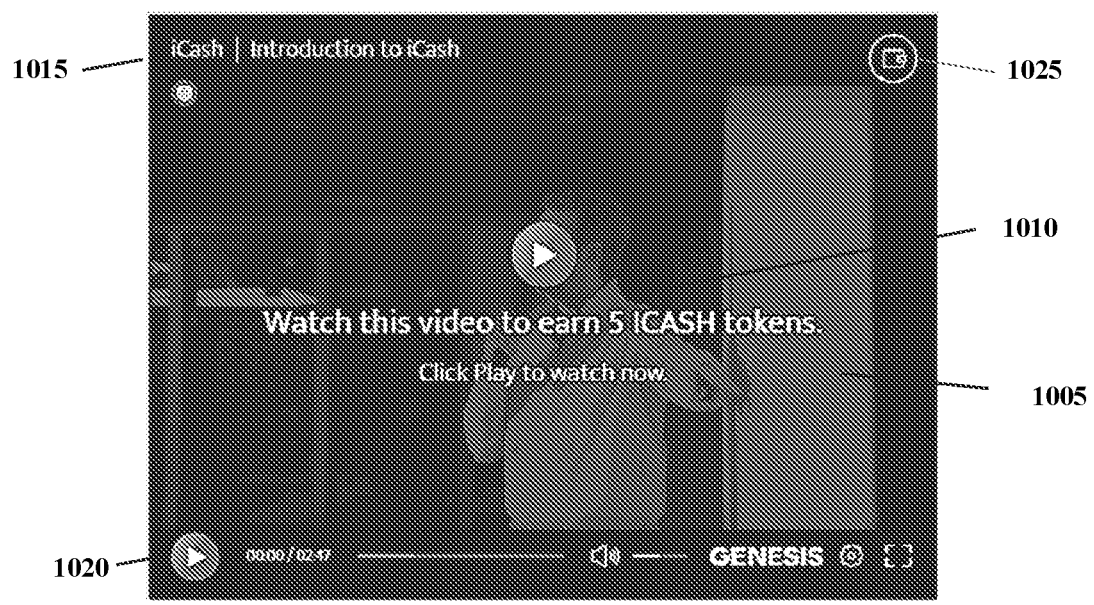
Figure 10C:
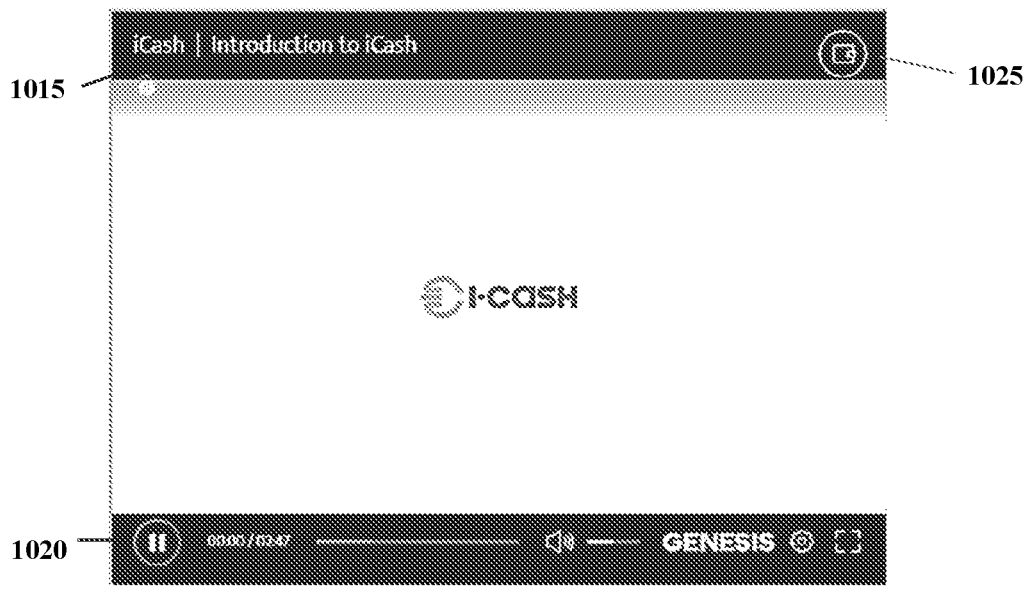
Figure 10D:
Figure 10E:
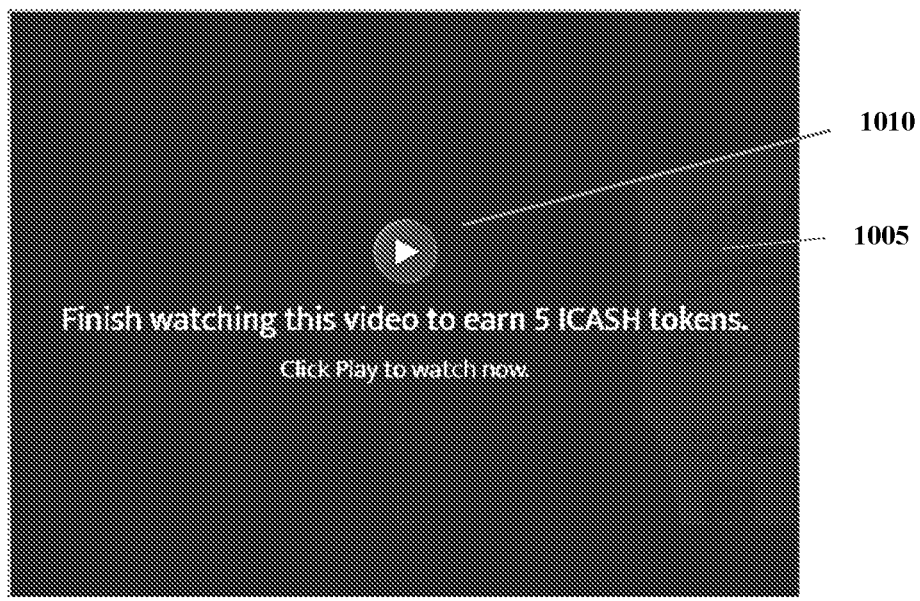
Figure 10F:
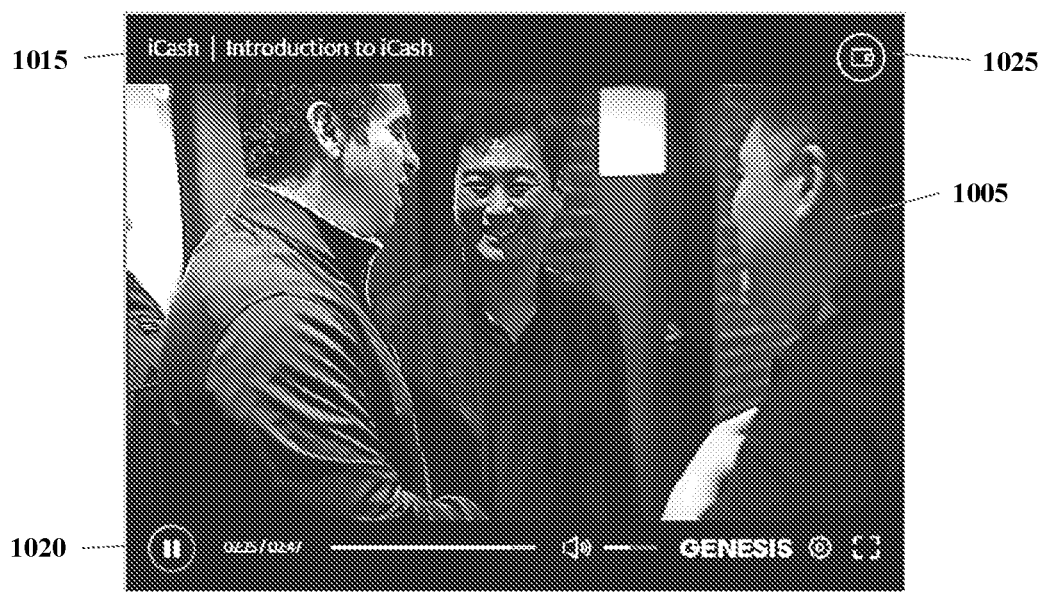
Figure 10G:
Figure 10H:
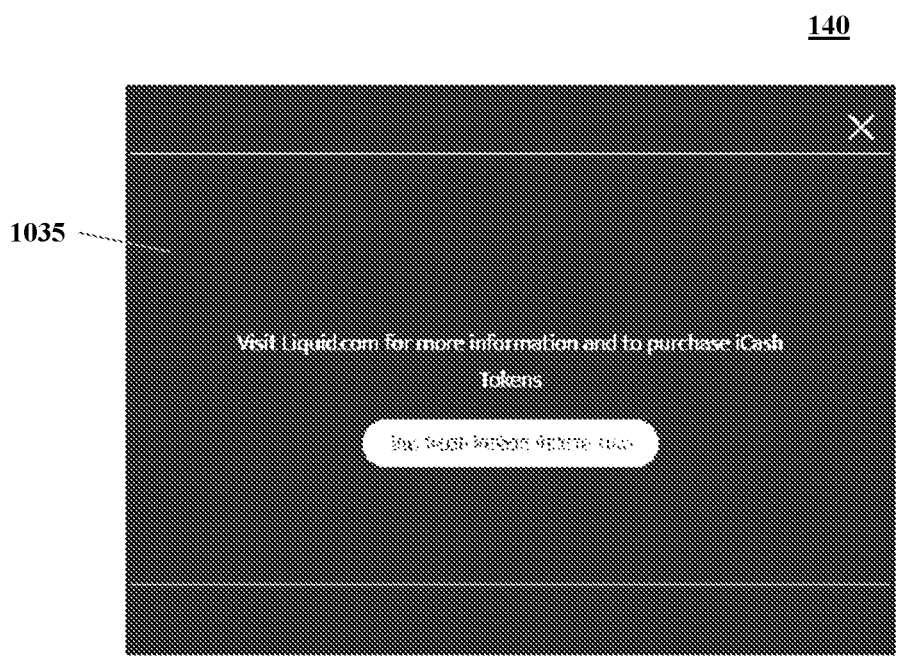
Figure 10I:
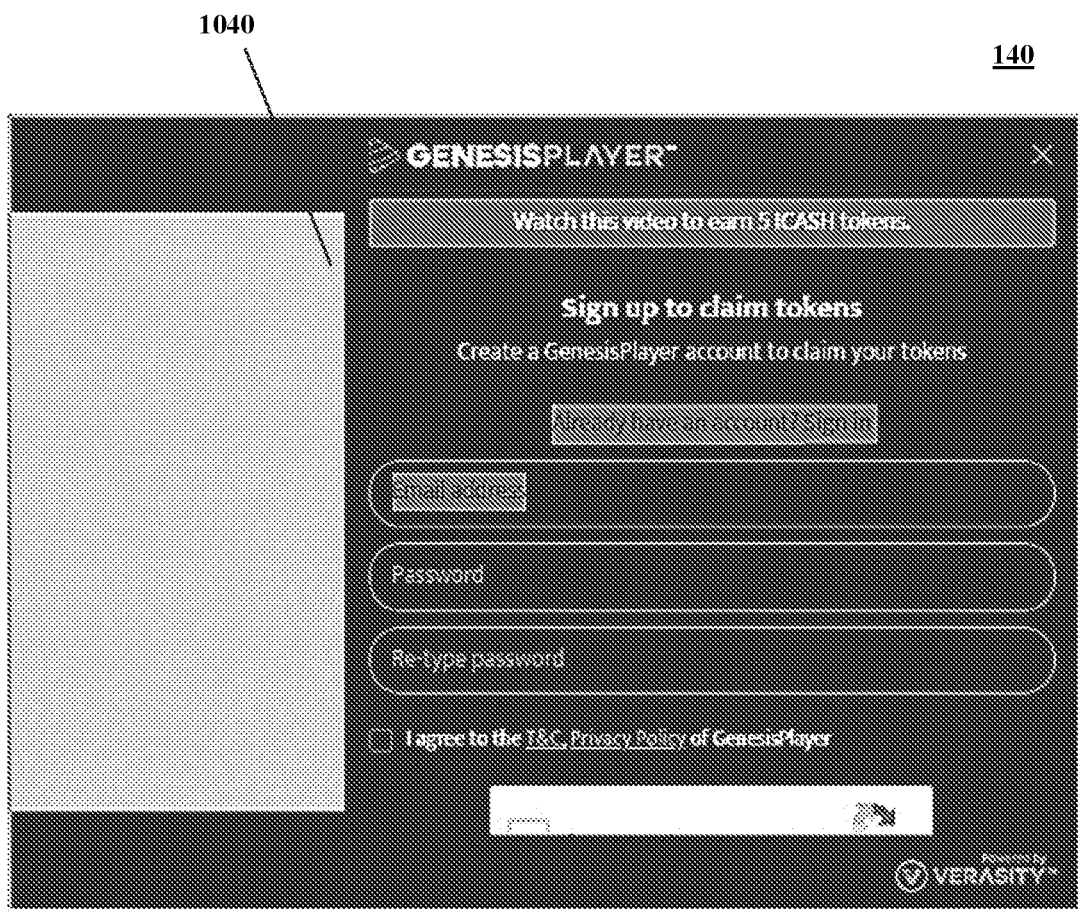

FIGS. 10A-10I together depict an illustrative rewarded viewing user interface in an exemplary rewarded viewing scenario. In the example depicted by FIGS. 10A-10I, the exemplary rewarded viewing user interface is the video display 140, depicted in FIG. 1 and FIG. 6. In the illustrated example, the video display 140 presents the video 1005 to a user, permitting the user to earn rewards in return for viewing the video 1005. In the example illustrated by FIG. 10A, the exemplary video display 140 displays the video 1005 paused and overlaid with the rewarded video status and control 1010 displaying a rewarded video introduction. In FIG. 10B, the video display 140 presents the user with the reward program introduction 1015 to assist the user collecting their rewards. In the illustrated embodiment, the video display 140 presents the user with video player controls 1020 and the reward status indicator 1025. In FIG. 10C, the user activated the video player controls 1020 to play the reward program introduction 1015. In the illustrated embodiment, the video display 140 includes the reward indicator 1025 illustrating reward status. In FIG. 10D, the video display 140 begins to present the video 1005 to the user to earn rewards. In FIG. 10E, the user has paused the video 1005, and the rewarded video status and control 1010 displays an indication the user must finish watching the video 1005 to earn rewards. In the depicted embodiment, the indication displayed by the rewarded video status and control 1010 includes the reward value the user will earn when the video 1005 has been watched In FIG. 10F, the user has resumed playing the video 1005 on the video display 140 using the video player controls 1020. In the depicted embodiment, the video display 140 includes the reward indicator 1025 illustrating reward status. In FIG. 10G, the user has been assigned rewards for viewing the video and the video display 140 presents the user with the assigned rewards indication 1030. In FIG. 10H, the video display presents the user with the rewards program redemption display 1035, directing the user to a site at which rewards may be tokenized. In FIG. 10I, the video display 140 presents the user with a rewards sign-up page, whereby the user may register to claim their rewards.

Although various embodiments have been described with reference to the Figures, other embodiments are possible. For example, some embodiments may be referred to as a LUM 'Rewarded Viewing' video player. Various embodiment Rewarded Viewing video player designs may be designed to allow video publishers to reward their viewers who watch their exclusive content on their website in order to promote their business, build community, reach investors, build brand awareness, increase video views and user engagement. In various implementations, a 'Rewarded Viewing' module may also be embedded into a 3rd-party video player either using an embodiment SDK, or integrated directly, and therefore is not dependent on any third party OVP (Online Video Player) platform. Some embodiment rewarded viewing video player implementations may be used in conjunction with LUM OVP, LUM Ad Stack, or LUM Player, for those customers who may use various LUM end-to-end solutions. In an illustrative example, various rewarded viewing embodiment designs may include a LUM Player or module which may be implemented using an SDK (or directly integrated components) which may be added to a third party player.

In the Summary above and in this Detailed Description, and the Claims below, and in the accompanying drawings, reference is made to particular features of various embodiments of the invention. It is to be understood that the disclosure of embodiments of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

In the present disclosure, various features may be described as being optional, for example, through the use of the verb "may;", or, through the use of any of the phrases: "in some embodiments," "in some implementations," "in some designs," "in various embodiments," "in various implementations,", "in various designs," "in an illustrative example," or "for example;" or, through the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

In various embodiments. elements described herein as coupled or connected may have an effectual relationship realizable by a direct connection or indirectly with one or more other intervening elements.

In the present disclosure, the term "any" may be understood as designating any number of the respective elements, i.e. as designating one, at least one, at least two, each or all of the respective elements. Similarly, the term "any" may be understood as designating any collection(s) of the respective elements, i.e. as designating one or more collections of the respective elements, a collection comprising one, at least one, at least two, each or all of the respective elements. The respective collections need not comprise the same number of elements.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of embodiments of the invention, even those disclosed solely in combination with other features of embodiments of the invention, may be combined in any configuration excepting those readily apparent to the person skilled in the art as nonsensical. Likewise, use of the singular and plural is solely for the sake of illustration and is not to be interpreted as limiting.

In the present disclosure, all embodiments where "comprising" is used may have as alternatives "consisting essentially of," or "consisting of" In the present disclosure, any method or apparatus embodiment may be devoid of one or more process steps or components. In the present disclosure, embodiments employing negative limitations are expressly disclosed and considered a part of this disclosure.

Certain terminology and derivations thereof may be used in the present disclosure for convenience in reference only and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

The term "comprises" and grammatical equivalents thereof are used herein to mean that other components, ingredients, steps, among others, are optionally present. For example, an embodiment "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)— (a second number)," this means a range whose limit is the second number. For example, 25 to 100 mm means a range whose lower limit is 25 mm and upper limit is 100 mm.

Many suitable methods and corresponding materials to make each of the individual parts of embodiment apparatus are known in the art. According to an embodiment of the present invention, one or more of the parts may be formed by machining, 3D printing (also known as "additive" manufacturing), CNC machined parts (also known as "subtractive" manufacturing), and injection molding, as will be apparent to a person of ordinary skill in the art. Metals, wood, thermoplastic and thermosetting polymers, resins and elastomers as may be described herein-above may be used. Many suitable materials are known and available and can be selected and mixed depending on desired strength and flexibility, preferred manufacturing method and particular use, as will be apparent to a person of ordinary skill in the art.

Any element in a claim herein that does not explicitly state "means for" performing a specified function, or "step for" performing a specific function, is not to be interpreted as a "means" or "step" clause as specified in 35 U.S.C. § 112 (f). Specifically, any use of "step of" in the claims herein is not intended to invoke the provisions of 35 U.S.C. § 112 (f).

According to an embodiment of the present invention, the system and method may be accomplished through the use of one or more computing devices. As depicted, for example, at least in FIG. 1, FIG. 2, FIG. 3, FIG. 4, FIG. 5, and FIG. 6, one of ordinary skill in the art would appreciate that an exemplary system appropriate for use with embodiments in accordance with the present application may generally include one or more of a Central processing Unit (CPU), Random Access Memory (RAM), a storage medium (e.g., hard disk drive, solid state drive, flash memory, cloud storage), an operating system (OS), one or more application software, a display element, one or more communications means, or one or more input/output devices/means. Examples of computing devices usable with embodiments of the present invention include, but are not limited to, proprietary computing devices, personal computers, mobile computing devices, tablet PCs, mini-PCs, servers or any combination thereof. The term computing device may also describe two or more computing devices communicatively linked in a manner as to distribute and share one or more resources, such as clustered computing devices and server banks/farms. One of ordinary skill in the art would understand that any number of computing devices could be used, and embodiments of the present invention are contemplated for use with any computing device.

In various embodiments, communications means, data store(s), processor(s), or memory may interact with other components on the computing device, in order to effect the provisioning and display of various functionalities associated with the system and method detailed herein. One of ordinary skill in the art would appreciate that there are numerous configurations that could be utilized with embodiments of the present invention, and embodiments of the present invention are contemplated for use with any appropriate configuration.

According to an embodiment of the present invention, the communications means of the system may be, for instance, any means for communicating data over one or more networks or to one or more peripheral devices attached to the system. Appropriate communications means may include, but are not limited to, circuitry and control systems for providing wireless connections, wired connections, cellular connections, data port connections, Bluetooth connections, or any combination thereof. One of ordinary skill in the art would appreciate that there are numerous communications means that may be utilized with embodiments of the present invention, and embodiments of the present invention are contemplated for use with any communications means.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description may set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a sequence of computational instructions or program instructions. It will be appreciated that a programmable apparatus (i.e., computing device) can receive such a computer program and, by processing the computational instructions thereof, produce a further technical effect.

A programmable apparatus may include one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A system for determining rewards of a web page containing a video player providing video content to a user, comprising:
    a rewarded viewing video distribution module, comprising computer-executable code stored in non-volatile memory;
    a processor; and
    a rewarded viewing module, comprising computer-executable code stored in non-volatile memory;
    wherein the rewarded viewing video distribution module, the processor, and the rewarded viewing module are configured to:
       provide an application programming interface configured to provide WebSocket client user authentication including single sign-on authentication in a silent mode to a user authentication mechanism used by the user;
       determine an amount of the video content viewed by the user based on the processor executing processor-executable program instructions of the rewarded viewing module, wherein determining the viewed amount of the video content includes encoding and decoding a plurality of unique identifiers in a plurality of video frames of the video content and confirming said plurality of video frames of the video content were viewed;
       determine whether the viewed amount of the video content meets a threshold for assigning rewards based on comparing a first data based on the processor executing the processor-executable program instructions of the rewarded viewing module with a second data of a promotional campaign; and
       determine a promotional campaign real-time availability for the web page.

2. The system of claim 1, wherein the rewarded viewing video distribution module, the processor, and the rewarded viewing module are further configured to:
    assign rewards of the promotional campaign to the user based on the first data.

3. The system of claim 1, wherein the rewarded viewing video distribution module, the processor, and the rewarded viewing module are further configured to add accounting information to the video content;
    wherein determining the viewed amount of the video content is based on the accounting information.

4. The system of claim 3, wherein the rewarded viewing video distribution module, the processor, and the rewarded viewing module are further configured to send an electronic message including the video content having the accounting information.

5. The system of claim 1, wherein the rewarded viewing module is embedded in the web page using a software development kit.

6. The system of claim 1, wherein determining the viewed amount of the video content viewed by the user includes determining a percentage of the video content viewed by the user.

7. The system of claim 1, wherein assigning rewards of the promotional campaigns database to the user based on the first data includes assigning rewards of the promotional campaigns database to the user based on a percentage of content viewed when the predetermined threshold is met.

8. The system of claim 1, wherein the rewarded viewing video distribution module, the processor, and the rewarded viewing module are further configured to automatically provide the user with a marketplace credit to spend the rewards.

9. The system of claim 1, wherein determining the promotional campaign real-time availability for the web page includes determining the promotional campaign real-time availability for a web domain of the web page.

10. The system of claim 1, wherein encoding and decoding the plurality of unique identifiers in the plurality of video frames of the video content includes encoding and decoding a unique identifier of the plurality of unique identifiers in each video frame of the plurality of video frames.

11. The system of claim 10, wherein determining the viewed amount of the video content includes decoding the unique identifier from each video frame.

12. A method for determining rewards of a web page containing a video player providing video content to a user, comprising:
    providing an interface configured to provide WebSocket client user authentication including single-sign-on authentication in a silent mode to a user authentication mechanism used by the user;
    determining an amount of the video content viewed by the user based on a processor executing processor-executable program instructions of the rewarded viewing module, wherein determining the viewed amount of the video content includes encoding and decoding a plurality of unique identifiers in a plurality of video frames of the video content;
    determining whether the viewed amount of the video content meets a threshold for assigning rewards based on comparing a first data based on the processor executing the processor-executable program instructions of the rewarded viewing module with a second data of a promotional campaign; and
    determining a promotional campaign real-time availability for the web page.

13. The method of claim 12, further comprising adding accounting information to the video content, wherein the determining the viewed amount of the video content is based on the accounting information.

14. The method of claim 12, further comprising:
    assigning rewards of the promotional campaign to the user based on the first data.

15. The method of claim 12, further comprising the step of encoding a plurality of unique identifiers in a plurality of video frames of the video content to assist with determining whether the viewed amount of the video content meets a threshold for assigning rewards.

16. A system for determining rewards of a web page containing an OVP video player providing video content to a user, comprising:
    a rewarded viewing video distribution module, comprising computer-executable code stored in non-volatile memory;
    a processor; and
    a rewarded viewing plugin configured to be embedded in the web page containing the OVP video player;
    wherein the rewarded viewing video distribution module, the processor, and the rewarded viewing plugin are configured to:
        determine an amount of the video content viewed by the user based on the processor executing processor-executable program instructions of the rewarded viewing plugin embedded in the OVP video player, wherein determining the viewed amount of the video content includes encoding and decoding a plurality of unique identifiers in a plurality of video frames of the video content;
        determine whether the viewed amount of the video content meets a predetermined threshold for assigning rewards based on comparing a first data based on the processor executing the processor-executable program instructions of the rewarded viewing plugin with a second data of a promotional campaigns database;
        determine a promotional campaign real-time availability for the web page; and
        provide an interface configured to provide WebSocket client user authentication including single sign-on authentication in a silent mode to a user authentication mechanism used by the user.

17. The system of claim 16, wherein determining the viewed amount of the video content includes encoding a plurality of unique identifiers in a plurality of video frames of the video content.

18. The system of claim 16, wherein the rewarded viewing video distribution module, the processor, and the rewarded viewing plugin are further configured to add accounting information to the video content;
    wherein the determining the viewed amount of the video content is based on the accounting information.

19. The system of claim 16, wherein the rewarded viewing video distribution module, the processor, and the rewarded viewing plugin are further configured to:
    assign rewards of the promotional campaigns database to the user based on the first data; and
    display a rewards indicator in the OVP video player based on the first data.

* * * * *